United States Patent

Timmerman et al.

[11] Patent Number: 5,380,619
[45] Date of Patent: Jan. 10, 1995

[54] POLYMERIC PHOSPHONIUM MORDANT AND PHOTOGRAPHIC ELEMENT CONTAINING THE SAME

[75] Inventors: Daniël, M. Timmerman; Daniël A. Claeys, both of Mortsel; Wilhelmus Janssens, Aarschot, all of Belgium

[73] Assignee: Agfa-Gevaert, N.V., Mortsel, Belgium

[21] Appl. No.: 226,395

[22] Filed: Apr. 12, 1994

Related U.S. Application Data

[63] Continuation of Ser. No. 437,766, Nov. 15, 1989, abandoned, which is a continuation of Ser. No. 199,992, May 26, 1988, abandoned.

[30] Foreign Application Priority Data

Jun. 16, 1987 [EP] European Pat. Off. ........ 87201146.5

[51] Int. Cl.$^6$ .............................................. G03C 5/54
[52] U.S. Cl. .................................. 430/213; 430/941; 526/274; 526/278; 525/333.3; 525/333.4; 525/329.2
[58] Field of Search ................. 430/213, 941, 518; 526/274, 278; 525/329.2, 333.4, 333.3, 916

[56] References Cited

U.S. PATENT DOCUMENTS

| | | | |
|---|---|---|---|
| 3,168,502 | 2/1965 | Sexsmith et al. | 430/274 |
| 3,547,649 | 12/1970 | Franco | 430/941 |
| 3,958,995 | 5/1976 | Campbell et al. | 430/941 |
| 4,701,400 | 10/1987 | Katoh | 430/941 |
| 4,812,391 | 3/1989 | Toya et al. | 430/213 |

*Primary Examiner*—Richard L. Schilling
*Attorney, Agent, or Firm*—Breiner & Breiner

[57] ABSTRACT

Phosphonium mordanting polymer comprising randomly distributed recurring units corresponding to the general formula (I)

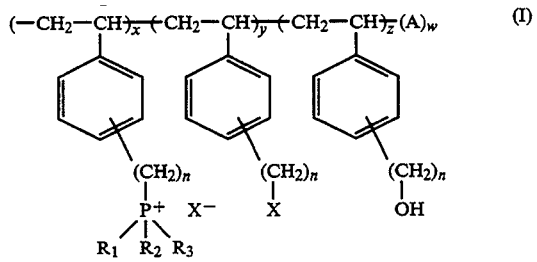

wherein:
A represents a unit that is derived from a copolymerizable monomer having a hydrophobic character e.g. acrylonitrile,
n represents an integer of from 1 to about 12;
each of $R_1$, $R_2$ and $R_3$ (same or different) represents a $C_1$-$C_8$ alkyl group, a cycloalkyl group or an aryl group;
$X^-$ represents an acid anion e.g. a halogen anion, or an anion derived from an inorganic acid;
$x+y+z$ represents from about 2 mole % to about 70 mole % with $y+z$ maximum 15 mole % and
w represents from about 30 mole % to about 98 mole %.

5 Claims, No Drawings

POLYMERIC PHOSPHONIUM MORDANT AND PHOTOGRAPHIC ELEMENT CONTAINING THE SAME

This is a continuation of application Ser. No. 07/437,766 filed on Nov. 15, 1989, now abandoned, which in turn is a continuation of application Ser. No. 07/199,992 filed on May 26, 1988, now abandoned.

DESCRIPTION

The present invention relates to a polymeric phosphonium mordanting agent and to an image-receptor element, suitable for carrying out a dye diffusion transfer imaging process, containing an image-receiving layer comprising said mordanting agent.

A dye diffusion transfer process is based on the imagewise transfer of diffusible dye molecules from an imagewise exposed light-sensitive element into a water-permeable image-receiving layer containing a mordant for the dye(s). The imagewise diffusion of the dye(s) is controlled by the development of one or more imagewise exposed light-sensitive layers, that for the production of a multicolor image are differently spectrally sensitized and contain respectively yellow, magenta and cyan dye or dye-providing molecules.

The dye(s) can be made to diffuse in imagewise distribution according to any known dye diffusion transfer imaging system. All dye diffusion transfer imaging systems are based on the same principle of modifying the solubility of the dyes as a function of the amount of photographic silver halide developed. In commonly known dye diffusion transfer imaging processes the dye-providing substances are either initially mobile in alkaline aqueous media and become imagewise immobilized during processing, or initially immobile and become imagewise mobilized during processing. A survey of such processes has been given by Van de Sande C. C. in Angew. Chem. Int. Ed. Engl. 22(3), 1983, pages 191 to 209. More details on such processes and on dye-providing substances can be found in the literature cited therein and in DE-A-1095115, 1930215, 1772929, 2242762, 2505248, 2543902, 2645656, and in EP-A-89069, 109701, 173361 and 219892 and in Research Disclosure item 15162 (November 1976).

The image-receiving layer can be coated on a support and form part of a light-insensitive image-receptor element that is to be brought in contact for development with a light-sensitive element comprising a support, at least one light-sensitive silver halide emulsion layer and associated with said silver halide emulsion layer a dye-providing substance. Alternatively, such image-receiving layer can also be an integrating constituent of a monosheet material comprising a light-sensitive element and an image-receptor element.

Any material can be employed as image-receiving layer in dye diffusion transfer imaging processes, provided it performs the desired function of mordanting or otherwise fixing the diffusing dye(s). The selection of the mordanting agent is determined by the nature of the dye(s) to be mordanted.

It is for instance known to mordant acid dyes with basic polymeric mordants such as the basic polymers described in U.S. Pat. Nos. 2,484,430, 2,882,156 and 4,186,014. Unfortunately, the color densities obtained after mordanting of the diffused dye(s) by these polymeric mordanting agents are insufficient.

Non-polymeric phosphonium mordanting agents are found to yield high color densities upon reaction with diffusing dye(s). However, non-polymeric phosphonium salts have the disadvantage of bleeding, in other words of diffusing, mainly at high relative humidity from the image-receiving layer during storage before image formation therein towards the surface of the image-receiving layer or to a superjacent protective layer. As a result, the surface of the image-receiving layer or of the superjacent protective layer can become smeary and very susceptible to fingerprints. To reduce this bleeding the non-polymeric phosphonium mordanting agents can be stabilized by means of a polymer comprising free acid groups as described in EP-A-264496. The use of this latter mordanting composition gives rise to particular difficulties due to the complex nature of the composition.

Polymeric phosphonium mordanting agents are also known and are described In e.g. FR-A-1477003.

Homopolymeric phosphonium mordants have the disadvantage that the mordanted image dyes tend to migrate from the image areas into the non-image areas and this migration of dye results in reduced color densities and unsharp dye images.

It is an object of the present invention to provide an improved polymeric phosphonium mordanting agent that yields high color densities, is substantially fast to diffusion and has good dye-holding properties.

It is another object of the present invention to provide an image-receptor element containing an image-receiving layer comprising said mordanting agent.

According to the present invention a phosphonium mordanting polymer is provided, that is capable of fixing acid dyes, and that comprises randomly distributed recurring units corresponding to the general formula (I)

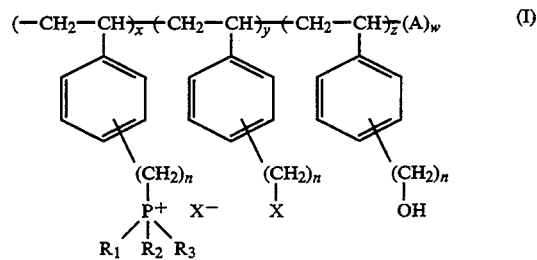

wherein:
A represents a unit that is derived from a copolymerizable monomer having a hydrophobic character e.g. styrene, vinyltoluene and homologues, 2- and 4-homologues of vinylpyridine, 2-methyl,5-vinylpyridine, alkylmethacrygate with alkyl being a $C_1$–$C_5$ alkyl group, alkylacrylates with alkyl being a $C_1$–$C_5$ alkyl group, vinylacetate, acrylonitrile, methacrylonitrile, allylcyanide, crotonnitrile, cyanoalkylacrylate with alkyl being a $C_1$–$C_5$ alkyl group, diacetonacrylamide or diacetonmethacrylamide;

n represents an integer of from 1 to about 12;

each of $R_1$, $R_2$ and $R_3$ (same or different) represents a $C_1$–$C_8$ alkyl group e.g. n-butyl, a substituted $C_1$–$C_8$ alkyl group e.g. a methylol group, a cyanoethyl group or an aralkyl group, a cycloalkyl group, an aryl group e.g. phenyl, or a substituted aryl group;

$X^-$ represents an acid anion e.g. a halogen anion e.g. $Cl^-$, $Br^-$ or $I^-$, or an anion derived from an inorganic acid e.g. $NO_3^-$, $HSO_4^-$, $SO_4^{--}$, $H_2PO_4^-$, $HPO_4^{--}$ or $PO_4^{---}$;

x+y+z represents from about 2 mole % to about 70 mole % with y+z maximum 15 mole % and w represents from about 30 mole % to about 98 mole %.

The following preparations illustrate the synthesis of some particularly useful mordanting polymers in accordance with the present invention.

PREPARATION 1

Preparation of co(acrylonitrile/m,p-vinylbenzyl,-tributylphosphoniumchloride)

a) Preparation of co(acrylonitrile/vinylbenzylchloride)

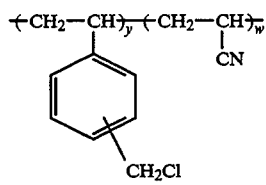

A 1-liter reaction vessel was provided with a stirring device, a thermometer, a nitrogen inlet tube, a reflux condenser and a dropping funnel of ca. 500 ml.

The following ingredients were introduced in a separate 1-liter flask, provided with stirrer,: 201.3 g (1.32 mole) of m,p-vinylbenzylchloride, 46.6 g (0.88 mole) of acrylonitrile, 1.24 g of azobisisobutyronitrile and butanon to reach a total volume of 496 ml. The reaction mixture was stirred at room temperature to reach a homogeneous solution. The m,p-vinylbenzylchloride was sold by Dow and was added without further purification. Gas chromatography and mass spectrometry revealed that this vinylbenzylchloride consisted of 70.1% p-vinylbenzylchloride, 26.9% m-vinylbenzylchloride and 3.0% impurities. These impurities contained 0.5% mono-chloro,p-vinylbenzylchloride and 2.5% of a mixture of dichloro,p-vinyltoluene, trichloro,p-vinyltoluene and dichloro,p-ethyltoluene.

150 ml of this homogeneous solution was put into the reaction vessel and heated while stirring and bubbling nitrogen through the solution. After 30 minutes the temperature of the solution had increased to 81° C. and the solution started to reflux gently.

The polymerization reaction proceeded exothermally and the heating was turned off. The maximum temperature reached in the reaction medium was 83° C.

After 36 minutes the temperature dropped to 80° C. and one started to pump the rest of the monomer solution out off the flask into the reaction vessel at a rate of ca. 4.6 ml/min. The temperature in the reaction vessel varied between 800° C. and 83° C.

After 1 h 50 min the total amount of monomer had been added and the heating was turned on again.

After 3 h 30 min a pale yellow, slightly viscous solution was obtained and a further amount (1.24 g) of azobisisobutyronitrile was added.

The solution was further heated to reach a temperature between 79° C. and 81° C. and after a reaction period of 20 hours a viscous polymer solution was obtained.

This solution was run as a fine jet into a mixture of 2 l of hexane and 2 l of ethanol while stirring.

The precipitated copolymer was washed with 500 ml of the same hexane/ethanol mixture and finally dissolved in butanon.

Yield: 955.7 g, 25.84% by weight.

By analysis it was found that the copolymer comprised by weight 18.8% chlorine, 4.32% nitrogen, 70.7% carbon and 5.86% hydrogen from which there can be calculated that the copolymer comprises 60 mole % of m,p-vinylbenzylchloride units and 40 mole % of acrylonitrile units.

Viscosity: 10.4 mPa s (20% solution in butanon, 25° C.).

b) Preparation of co(acrylonitrile/m,p-vinylbenzyl,-tributylphosphoniumchloride)

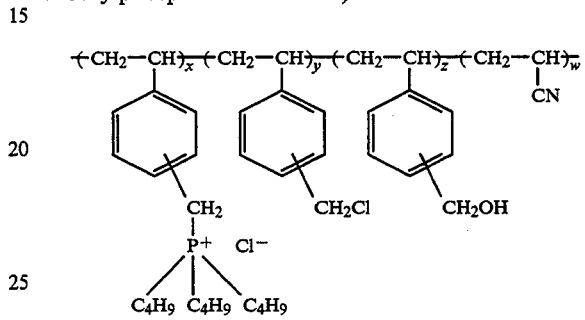

In a 1-liter flask, provided with stirrer, reflux condenser, thermometer and dropping funnel, 463.1 g of the solution of preparation 1a were introduced whereupon the solution was concentrated by heating under vacuum to reach 406 g (453 ml).

To this viscous solution 145 ml of methylglycol were added whereupon the whole solution was stirred homogeneously and heated to 45° C.

From the dropping funnel, filled with 135.03 g (0.635 ml) of tributylphosphine (purity 95%), the phosphine solution was added slowly to the polymer solution at a rate of 1.93 g/min.

The quaternation reaction proceeded slightly exothermally and was heated till reflux while stirring (solution temperature between 81° C. and 82° C.). After 70 minutes the total quantity tributylphosphine had been added to the polymer solution.

Thereupon the solution, whose viscosity had visually strongly increased, was stirred and heated to a solution temperature of ca. 81° C. For a period of 6 hours.

After cooling, the viscous solution was run with a fine jet into 3 l of n-hexane while stirring efficiently. The co(acrylonitrile/m,p-vinylbenzyl,tributylphosphoniumchloride) copolymer precipitated and was thoroughly washed with 500 ml of fresh n-hexane and afterwards dissolved in a mixture of 300 ml of demineralized water and 1200 ml of aceton.

The aceton was distilled off from this solution while simultaneously adding demineralized water. 1012.5 ml solution was obtained wherein 242.05 g of copolymer was dissolved. This solution with pH=3.1 was adjusted to pH=6.0 by adding 7.0 ml of a 1N sodium hydroxide solution.

From analysis results it follows that the polymer obtained has the following composition: x=81.70 wt % (47.79 mole %), y=0.64 wt % (0.87 mole %), z=7.52 wt % (11.64 mole %), w=10.14 wt % (39.7 mole %).

PREPARATIONS 2-7 a) Preparation of co(acrylonitrile/vinylbenzylchloride)

In an analoguous way as described in preparation 1a, a series of m,p-vinylbenzylchloride/acrylonitrile copolymers were prepared. In table 1 the reaction conditions and in table 2 the analysis results are listed for these copolymers.

TABLE 1

| prep no | m,p-vinylbenzyl-chloride in g | m,p-vinylbenzyl-chloride in mole % | acrylo-nitrite in g | acrylo-nitrite in mole % | azobisiso-butyronitrile in g | butanon tot. vol in ml |
|---|---|---|---|---|---|---|
| 2a | 231.8 | 80 | 20.14 | 20 | 2 × 1.26 | 504 |
| 3a | 106.75 | 70 | 15.9 | 30 | 2 × 0.61 | 307 |
| 4a | 152.5 | 50 | 53 | 50 | 2 × 1.03 | 514 |
| 5a | 152.5 | 40 | 79.5 | 60 | 2 × 1.16 | 580 |
| 6a | 114.38 | 30 | 92.75 | 70 | 2 × 1.04 | 518 |
| 7a(1) | 91.5 | 20 | 127.2 | 80 | 2 × 1.09 | 547 |

(1) in dimethylformamide

TABLE 2

| prep no | yield (2) in g | yield (2) in wt % | analysis % N | analysis % Cl | analysis % C | analysis % H | composition mol % y | composition mol % w |
|---|---|---|---|---|---|---|---|---|
| 2a | 923.7 | 27.44 | 2.11 | 20.93 | 70.4 | 5.85 | 80 | 20 |
| 3a | 704.4 | 16.85 | | 19.8 | | | 67 | 33 |
| 4a | 939.7 | 21.87 | | 17.1 | | | 49 | 51 |
| 5a | 2253 (3) | 10 | | 15.4 | | | 40 | 60 |
| 6a | 1072.1(3) | 19.3 | | 12.75 | | | | |
| 7a | 192.85 | 100 | 14.87 | 10.15 | | | 21 | 79 |

(2) in butanon
(3) solution in butanon is white colored b) Preparation of co(acrylonitrile/m,p-vinylbenzyl,-tributylphosphoniumchloride)

In an analoguous way as described in preparation 1b, a series of acrylonitrile/m,p-vinylbenzyltributylphosphoniumchloride copolymers were prepared. In table 3 the reaction conditions and in table 4 the analysis results are listed for these copolymers.

TABLE 3

| prep no | copolymer solution from table 2 (1) in g | copolymer solution from table 2 (1) in wt % | after dilution (2) in wt% | tributylphosphine in g | tributylphosphine in mole |
|---|---|---|---|---|---|
| 2b | 450.4 | 27.44 | 20 | 158.14 | 0.7437 |
| 3b | 674.1 | 16.854 | 20 | 137.51 | 0.6467 |
| 4b | 919.19 | 21.87 | 20 | 207.48 | 0.9758 |
| 5b | 1087.5 | 10.0 | 6.91 | 99.4 | 0.4675 |
| 6b(3) | 1041.2 | 19.32 | 10.0 | 154.46 | 0.7264 |
| 7b(3) | 36.2 | 100.0 | 10.0(4) | 21.065 | 0.099 |

(1) in butanon
(2) dilution with methylglycol to reach a mixture of 1 volume of methylglycol and 2.5 volumes of butanon
(3) in dimethylformamide; this phosphonium copolymer does not dissolve in water
(4) in aceton; during the synthesis the phosphonium copolymer precipitated and was afterwards purified by dissolving in dimethylformamide and precipitating in a mixture of 1 volume of hexane and 1 volume of ether

TABLE 4

| prep no | yield in % | analysis meq Cl⁻/g | analysis meq Cl/g | composition in mole % x | composition in mole % y | composition in mole % z | composition in mole % w |
|---|---|---|---|---|---|---|---|
| 2b | 100 | 2.456 | 2.479 | 63.2 | 0.6 | 16.2 | 20.0 |
| 3b | 100 | 2.494 | 2.525 | 59.5 | 0.7 | 6.8 | 33.0 |
| 4b | 93.7 | 2.344 | 2.390 | 45.5 | 0.9 | 2.6 | 51.0 |
| 5b | 100 | 2.191 | 2.193 | 36.3 | 0.0 | 3.96 | 59.7 |
| 6b(3) | 100 | 1.955 | 2.011 | 26.61 | 0.76 | 2.63 | 70 |
| 7b(3) | | 1.546 | 1.941 | 16.6 | 4.2 | 0.2 | 79.0 |

PREPARATION 8

Preparation of co(methylmethacrylate/m,p-vinylbenzyl,tributylphosphoniumchloride)

a) Preparation of co(methylmethacrylate/m,p-vinylbenzylchloride)

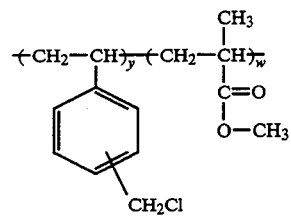

A 500 ml reaction vessel was provided with a stirring device, a thermometer, a nitrogen inlet tube and a reflux condenser.

The following ingredients were introduced subsequently in this reaction vessel: 50.0 g (0.50 mole) of methylmethacrylate, 76.25 g (0.50 mole) of m,p-vinylbenzylchloride, butanon to reach a total volume of 361 ml and 0.63 g of azobisisobutyronitrile. While continuously stirring and under nitrogen atmosphere the solution was slowly heated till gentle reflux.

After 20 minutes the temperature in the solution reached 73° C. The polymerization reaction proceeded exothermally and the heating was turned off.

After 23 minutes the temperature had dropped to 70° C. and the heating was turned on again. After 40 minutes the solution temperature had raised to 84° C. and a gentle reflux was obtained which was maintained for the further course of the reaction.

After a total reaction time of 8 hours the solution became slightly viscous and a further amount of azobisisobutyronitrile (0.63 g) was added.

After a total reaction periode of 16 hours the obtained polymer solution was cooled to room temperature and carefully poured out into 3 l of n-hexane with stirring efficiently.

The precipitated copolymer was washed with 400 ml of fresh n-hexane and finally dissolved in butanon.

Yield: 321.9 g, 36.55 wt %. Analysis of the total chlorine: 14.7%. y=63.1 wt % (53 mole %), w=36.9 wt % (47 mole %).

b) Preparation of co(methylmethacrylate/m,p-vinylbenzyl, tributylphosphoniumchloride)

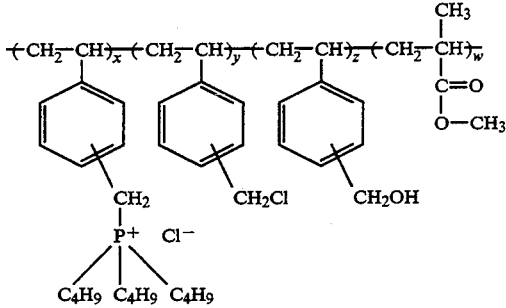

In a 1-liter flask, provided with stirrer, reflux condenser, thermometer and dropping funnel, 306.3 g solution of preparation 8a were introduced. This solution was concentrated to reach 216.9 g and subsequently dilluted, first with 52.0 ml of methylglycol and then with a mixture of 1 volume of methylglycol and 2.5 volumes of butanon to reach a total of 560 g solution with a weight percentage of 20.

The polymer solution in the flask was heated slowly to 69° C. while stirring whereupon 99.0 g (0.46556 mole) of tributylphosphine (purity 95%) were added from the dropping funnel at a rate of 5.80 g/min. After 12 minutes the temperature obtained in the solution was 80° C. and after 17 minutes all the phosphine had been added.

The reaction proceeded slightly exothermally and the heating did not need to be turned off.

The temperature in the polymer solution varied between 80° C. and 82° C. and after a total reaction time of 7 hours the solution was cooled and the copolymer isolated by slowly pouring out into 5 l of n-hexane while stirring.

The viscous precipitated polymer was washed with 500 ml of fresh n-hexane and redissolved in a mixture of 1.5 l of ethanol and 0.5 l of water.

The ethanol and residual hexane was distilled off from this solution while simultaneously adding water.

Yield: 745.1 g, 27.03 wt %, pH=2.2.

By adding 2.4 ml of a 1N sodium hydroxide solution the pH increased to 7.0. By adding water the concentration of the polymer solution was brought to 25 wt %.

Analysis results (sample isolated before addition of sodium hydroxide and dried under vacuum at 80° C. till constant weight): ionic chlorine: 2.049 meq/g, total chlorine: 2.147 meq/g.

The polymer obtained has the following composition: $x=44.3$ mole %, $y=2.1$ mole %, $z=6.6$ mole %, $w=47.0$ mole %.

A wide variety of acid dyes can be mordanted with the mordanting polymers of the present invention. Such dyes comprise acid groups e.g. carboxylic, sulfonic, ionizable sulfonamide- and hydroxy-substituted aromatic or heterocyclic groups that lend negative charges to the dyes. Such anionic dyes can be readily immobilized by means of the cationic mordanting polymers of the present invention.

Dye images bound by the mordants of this invention have increased color density and improved image sharpness due to the decreased water-solubility of the mordant-dye complex by incorporating hydrophobic monomer units in the phosphonium polymer.

The present invention also provides an image-receptor element suitable for use in dye diffusion transfer imaging processes which comprises a support and an image-receiving layer incorporating a hydrophilic colloid and a phosphonium mordanting polymer comprising recurring units corresponding to the general formula (I) that is capable of fixing acid dyes transferred to said image-receiving layer by diffusion.

The hydrophilic colloid used as a binder may be any natural or synthetic hydrophilic colloid generally used in the field of photography, such as gelatin, albumin, polyvinyl alcohol, polyvinylpyrrolidone, etc.

The phosphonium mordants according to the present invention may be used in the image-receptor element as a solution of the copolymer mordant in water or as a water-dispersible copolymer latex mordant.

A mixing ratio of the mordanting polymer to the binder and the coverage of the mordanting polymer can easily be determined by those skilled in the art depending on the amount of dye(s) to be mordanted, on the nature of the specific mordanting polymer, on the image-forming process to be used, etc. In general, the ratio of the mordanting polymer to the binder ranges from 20 to about 80% by weight. The mordanting polymer is usually incorporated into the image-receiving layer in amounts varying from about 0.2 to about 15 g per m$^2$, preferably from about 0.5 to about 5 g per m$^2$.

The image-receiving layer may also contain other conventional ingredients such as ultraviolet-absorbing substances to protect the mordanted dye images from fading e.g. substituted 2-hydroxyphenyl-benzotriazoles and hydroxybenzophenones, brightening agents e.g. stilbenes, coumarins, triazines, oxazoles, or dye stabilizers e.g. t-butyl-hydroxy-anisole, butylated hydroxytoluene, substituted chromanols, and alkyl-phenols, plasticizers, surface-active agents, hardeners, etc.

Good results are obtained e.g. when the image-receiving layer, which preferably is permeable to alkaline solution, has a thickness of approximately 2 to 10 um. Of course, the thickness can be modified depending upon the results aimed at.

Two or more kinds of the mordants of this invention may be used in one layer or in two or more layers of the same photographic element or mordants of this invention may be used together with other mordants.

The image-receiving layer can be covered with a protective layer, preferably a gelatin protective layer. Neutralizing layers and timing or inert spacer layers can also be employed in the practice of this invention.

The image-receiving layer can be coated directly onto the support or onto an adhesive layer or other layer previously applied to the support.

The support can be any of the transparent or opaque support materials customarily employed in the art. They include paper or paper coated on one or both sides with an Alpha-olefin polymer e.g. polyethylene, glass, and film materials such as e.g. cellulose acetate film, polyvinyl acetal film, polystyrene film, polyethylene terephthalate film, etc.

In one embodiment of this invention, a photosensitive element having one or plural silver halide emulsion layers on a support is, after imagewise exposure, superposed on an image-receptor element having at least one mordant layer composed of the polymer mordant of this invention on a support in a face-to-face relationship and then processed by spreading an alkaline processing composition between both elements. In this case, the image-receptor element may be peeled off from the photosensitive element.

In another embodiment of this invention, the support, the image-receptor element and the photosensitive element are in an integrated form as is known in the art, For photosensitive elements in this invention, silver halides and dye image-providing compounds associated with the silver halides are used. The dye image-providing compounds used in this case may be dye image-providing compounds which are initially mobile or immobile in the photosensitive element when the photosensitive element is processed by the alkaline processing composition.

The mordants used in accordance with the present invention can also be employed in hydrophilic colloid layers of a photographic element to mordant e.g. antihalation or filter dyes, The present invention is illustrated by the following examples.

EXAMPLE

Preparation of a phosphonium homopolymer

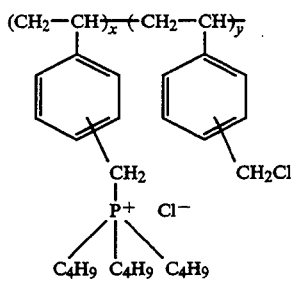

a) Preparation of poly(m,p-chloromethylstyrene)

In a closed mixing vessel at room temperature a homogeneous solution was prepared consisting of 610.0 g (4.0 mole) of m,p-chloromethylstyrene, 3.05 g of azobisisobutyronitrile and 451 ml of butanon.

In a 2-liter reactor vessel provided with a nitrogen inlet, stirrer, reflux condenser and thermometer 500 ml of this solution was introduced. The solution was heated under nitrogen atmosphere to 80° C. while stirring. This temperature was reached after 45 minutes. The polymerization reaction proceeded exothermally and the heating was turned off. The temperature of the liquid droped to 75° C.

After 1 h 25 min the heating was turned on again and one started to pump over the rest of the monomer solution out off the mixing vessel at a rate of 8–9 ml/min. The heating was tuned to a temperature variation of 79°–80° C. After 2 h 10 min the monomer solution had been completely pomped into the reaction vessel.

After a reaction period of 7 hours 3.05 g of azobisisobutyronitrile was added and this was repeated after 23 hours.

After a total reaction time of 29 hours the polymer solution in the reaction vessel was cooled, diluted with 300 ml of ethanol and run with a fine jet into a mixture of 2.25 l of ethanol and 2.25 l of n-hexane while stirring efficiently.

The precipitated polymer was dried at 50° C. under vacuum (ca. 1 mm Hg) till constant weight.

Yield: 606 g. Analysis of chlorine: 22.72% b) Preparation of a phosphonium homopolymer

In a 3-liter reactor vessel provided with stirrer, reflux condenser and thermometer, 604.7 g (3.965 mole) of the poly(m,p-chloromethylstyrene) of the previous step were dissolved in dimethylformamide to obtain a total volume of 2025 ml. This solution was gradually heated while stirring.

After 10 minutes the temperature had raised to 45° C. and 843.16 g (3.965 mole) of 95% tributylphosphine were added at a rate of 8.5–9 g/min.

After 30 minutes the temperature in the solution yielded 74° C. and the heating was slowed down because of the slightly exothermic reaction. After 50 minutes the solution in the reaction vessel was at 80° C. and during the further reaction per,ode the heating was tuned so as to keep the temperature between 79° C. and 81° C.

After a reaction period of 6 hours the reaction was stopped and the polymer solution was cooled to room temperature.

By slowly pouring out the solution in a mixture of 5 l of hexane and 5 l of ether while stirring, the phosphonium polymer was isolated as a viscous mass. After decantating the supernatant and washing in 8 l of ethylacetate the polymer was filtered off and finally dissolved in water from which the residual dissolved ethylacetate was removed by partial distillation.

Yield: 4000 g, of solution 33.76 wt %. Analysis of ionic chlorine: 2.688 meq/g. x=95.3 wt % (89.7 mole %), y=4.7 wt % (10.3 mole %).

A polyethylene terephthalate film support having a thickness of 100 μm and subbed first with a polyvinylidene chloride layer and next with a gelatin layer was coated with an image-receiving layer comprising per m²: gelatin (2.4 g), phosphonium homopolymer (2.0 g) formaldehyde (0.02 g). In this way comparative receptor element 1 was obtained.

A lightsensitive color diffusion transfer material as described in the example of U.S. Pat. No. 4,496,645 was exposed through a grey wedge having a constant of 0.1 and through a blue, green and red filter to obtain yellow, magenta and cyan images and then developed while in contact with the image-receiving layer of the above image-receptor element in a COPYPROOF T 42 diffusion transfer reversal processing apparatus (COPYPROOF is a registered trademark of Agfa-Gevaert Belgium) containing an aqueous alkaline activating bath comprising per liter: sodium hydroxide (25 g), sodium orthophosphate (25 g), cyclohexane dimethanol (25 g), sodium thiosulfate (2 g), potassium iodide (2 g), 2,2-methylpropylpropane diol (25 g), N-ethylbenzenepyridinium chloride (0.5 g) and distilled water to make 1000 ml.

After a contact time of 2 minutes, receptor 1 was separated from the lightsensitive material and rinsed and dried in a COPYPROOF WD 37 rinsing and drying apparatus.

The above described procedure was repeated in exactly the same way with a number of image-receptor elements (receptors 2 to 6) that differ from the above described receptor 1 by the mole ratio of copolymerized acrylonitrile in the phosphonium mordanting agent (equivalent amount of quaternated phosphonium per m²) and with image-receptor element 7 comprising a phosphonium mordanting agent with copolymerized methylmethacrylate.

The maximum density of the mordanted yellow (Y), magenta (M) and cyan (C) dyes obtained on the different receptor elements was measured in transmission by means of a MACBETH QUANTOLOG color densitometer.

The bleeding tendency was checked visually, a value of 0 being attributed to a receptor showing no bleeding at all (the mordanted dye is firmly hold and does not migrate), a value of 1 standing for slight bleeding, 2 standing for moderate bleeding (unsharp image), 3 standing for considerable bleeding, a value of 4 standing for a very high bleeding.

The results of the evaluations are listed in table 5.

TABLE 5

| receptor no | mordant prep. no | maximum density | | | bleeding tendency | | |
| --- | --- | --- | --- | --- | --- | --- | --- |
| | | Y | M | C | Y | M | C |
| 1 | homo | 92 | 92 | 145 | 3 | 4 | 4 |
| 2 | 2b | 97 | 91 | 145 | 3 | 4 | 4 |
| 3 | 3b | 91 | 89 | 148 | 2 | 4 | 4 |
| 4 | 1b | 107 | 110 | 160 | 0 | 2 | 2 |
| 5 | 4b | 108 | 114 | 159 | 0 | 1 | 1 |
| 6 | 5b | 108 | 114 | 157 | 0 | 0 | 0 |
| 7 | 8b | 78 | 96 | 151 | 2 | 3 | 3 |

These results show that by incorporating hydrophobic monomers in the phosphonium polymer higher color densities and less bleeding tendency are obtained.

We claim:

1. Dye image-receptor element suitable for use in dye diffusion transfer imaging processes having on a support an image-receiving layer containing a hydrophilic colloid and a phosphonium mordanting polymer consisting of randomly distributed recurring units corresponding to the general formula (I)

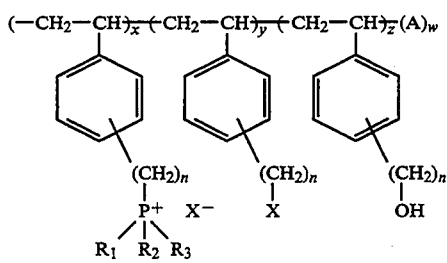

wherein:

A represents acrylonitrile or methacrylonitrile;

n represents an integer of from 1 to about 12;

each of $R_1$, $R_2$ and $R_3$ (same or different) represents a $C_1$-$C_8$ alkyl group, a cycloalkyl group or an aryl group;

X represents an halogen atom;

X$^-$ represents an halogen ion derived from X;

x+y+z represents from about 2 mole % to about 70 mole % with y+z maximum 15 mole % and x not equal to 0 mole %, and w represents from about 30 mole % to about 98 mole %.

2. Dye image-receptor element according to claim 1, wherein n equals 1.

3. Dye image-receptor element according to claim 1, wherein $R_1$, $R_2$ and $R_3$ each represent an alkyl group.

4. Dye image-receptor element according to claim 1, wherein said mordanting polymer is used as a solution of water and wherein w ranges from about 40 to about 60 mole %.

5. Dye image-receptor element according to claim 1 wherein said image-receptor element is in an integrated form with a photosensitive element comprising a light-sensitive silver halide emulsion layer and associated with said silver halide emulsion layer dye-providing substance.

* * * * *